United States Patent
Ozawa et al.

(10) Patent No.: US 9,796,844 B2
(45) Date of Patent: Oct. 24, 2017

(54) METHACRYLIC RESIN COMPOSITION

(71) Applicant: KURARAY CO., LTD., Kurashiki-shi (JP)

(72) Inventors: Hiroshi Ozawa, Tainai (JP); Toru Takahashi, Tainai (JP)

(73) Assignee: KURARAY Co., Ltd., Kurashiki-shi (JP)

( * ) Notice: Subject to any disclaimer, the term of this patent is extended or adjusted under 35 U.S.C. 154(b) by 76 days.

(21) Appl. No.: 14/441,096

(22) PCT Filed: Nov. 8, 2013

(86) PCT No.: PCT/JP2013/006605
§ 371 (c)(1),
(2) Date: May 6, 2015

(87) PCT Pub. No.: WO2014/073216
PCT Pub. Date: May 15, 2014

(65) Prior Publication Data
US 2015/0299449 A1    Oct. 22, 2015

(30) Foreign Application Priority Data

Nov. 9, 2012 (JP) ................................. 2012-247934
Jun. 28, 2013 (JP) ................................. 2013-136194

(51) Int. Cl.
| | |
|---|---|
| C09K 19/00 | (2006.01) |
| C08L 33/12 | (2006.01) |
| C08L 53/00 | (2006.01) |
| G02B 1/04 | (2006.01) |
| F21V 8/00 | (2006.01) |
| C08F 220/14 | (2006.01) |

(52) U.S. Cl.
CPC ............. *C08L 33/12* (2013.01); *C08L 53/00* (2013.01); *G02B 1/04* (2013.01); *G02B 6/0066* (2013.01); *C08F 220/14* (2013.01); *C08L 2201/10* (2013.01); *C08L 2203/20* (2013.01); *C08L 2205/025* (2013.01); *Y10T 428/1036* (2015.01); *Y10T 428/1059* (2015.01)

(58) Field of Classification Search
CPC .......... C08L 33/08; C08L 33/10; C08L 33/12; C08L 33/16; C08L 53/00; C08L 2201/10; C08L 2203/20; C08L 2205/025; C02B 6/0066; C08J 5/18; C08J 2333/10; C08J 2333/12; Y10T 428/1036; Y10T 428/105; Y10T 428/1059; Y10T 428/1077; Y10T 428/1082; Y10T 428/1086
USPC ......... 428/1.3, 1.33, 1.5, 1.55, 1.6; 362/622, 362/629, 611; 525/94, 228
See application file for complete search history.

(56) References Cited

U.S. PATENT DOCUMENTS

| | | | |
|---|---|---|---|
| 2003/0191243 | A1 | 10/2003 | Hamada et al. |
| 2008/0050572 | A1 | 2/2008 | Guerret |
| 2011/0218303 | A1 | 9/2011 | Oshima et al. |
| 2013/0217827 | A1 | 8/2013 | Ozawa et al. |
| 2013/0225753 | A1 | 8/2013 | Miyake et al. |
| 2015/0126697 | A1 | 5/2015 | Niimura et al. |
| 2015/0148508 | A1 | 5/2015 | Niimura et al. |
| 2015/0166695 | A1 | 6/2015 | Konishi et al. |

FOREIGN PATENT DOCUMENTS

| | | | |
|---|---|---|---|
| JP | 01261447 | A * | 10/1989 |
| JP | 2000-154329 | A | 6/2000 |
| JP | 2000319577 | A | 11/2000 |
| JP | 2003-277574 | A | 10/2003 |
| JP | 2010013613 | A | 1/2010 |
| WO | 2010-055798 | A1 | 5/2010 |
| WO | 2012-057079 | A1 | 5/2012 |
| WO | 2012057079 | A1 | 5/2012 |

OTHER PUBLICATIONS

International Search Report Issued Jan. 14, 2014 in PCT/JP13/006605 Filed Nov. 8, 2013.

* cited by examiner

*Primary Examiner* — Ruiyun Zhang
(74) *Attorney, Agent, or Firm* — Oblon, McClelland, Maier & Neustadt, L.L.P.

(57) ABSTRACT

A methacrylic resin composition containing 10 to 99 parts by mass of a methacrylic resin (A) containing 80% by mass or more of a methyl methacrylate unit, and 90 to 1 part by mass of a block copolymer (B) containing 10 to 60% by mass of a methacrylic acid ester polymer block (b1) and 90 to 40% by mass of an acrylic acid ester polymer block (b2), where the total of the methacrylic resin (A) and the block copolymer (B) is 100 parts by mass, where a weight-average molecular weight $Mw_{(A)}$ of the methacrylic resin (A), a maximum weight-average molecular weight $Mw_{(b1)}$ of the methacrylic acid ester polymer block (b1) and a maximum weight-average molecular weight $Mw_{(b2)}$ of the acrylic acid ester polymer block (b2) satisfy (1): $0.5 \leq Mw_{(A)}/Mw_{(b1)} \leq 2.5$ and (2): $40000 \leq Mw_{(b2)} \leq 120000$.

12 Claims, No Drawings

METHACRYLIC RESIN COMPOSITION

TECHNICAL FIELD

The present invention relates to a methacrylic resin composition. More specifically, the present invention relates to a methacrylic resin composition which is suitable as a forming material for a light guide plate or the like used in a planar light source element, which is excellent in mechanical properties, surface smoothness, transparency and the like and in which small variations in haze are produced in a wide temperature range.

BACKGROUND ART

Since in general, a methacrylic resin is excellent in optical properties such as transparency and the like and weatherability, it is conventionally used in various applications such as display members used in a lighting fixture, a signboard and the like, optical members used in a display device and the like, interior members, building members, electronic and electrical members, or medical members. In these applications, not only optical properties and weatherability, but also mechanical properties such as flexibility, bending resistance, impact resistance, bendability or the like are often required.

As a method for improving the mechanical properties described above, proposed are methacrylic resin compositions in which various other resins are added to a methacrylic resin. For example, known is a methacrylic resin composition comprising a methacrylic resin and a block copolymer comprising a methacrylic acid ester polymer block and an acrylic acid ester polymer block (see patent documents 1 and 2).

CITATION LIST

Patent Literature

Patent Document 1: WO 2010/055798 A
Patent Document 2: WO 2012/057079 A

SUMMARY OF THE INVENTION

Problems to be Resolved by the Invention

In general, the refractive index of a resin varies depending on the temperature. In the methacrylic resin composition described above, since the temperature dependence of the refractive index of the methacrylic resin differs from the temperature dependence of the refractive index of the added other resins (for example, in patent documents 1 and 2, the block copolymer comprising the methacrylic acid ester polymer block and the acrylic acid ester polymer block), the light transmittance may vary depending on the temperature. Hence, in an application in which transparency is required in a wide temperature range, for example, in the application of an optical member such as a light guide plate and the like used in a liquid crystal display device, a trouble might be caused.

An object of the present invention is to provide a methacrylic resin composition which is suitable as a forming material for a light guide plate or the like used in a planar light source element, which is excellent in mechanical properties, surface smoothness, transparency and the like and in which only small variations in haze are produced in a wide temperature range.

Means for Solving the Problems

The present inventors have performed intensive study, and consequently have completed the invention including the following aspects.

[1] A methacrylic resin composition comprising: 10 to 99 parts by mass of a methacrylic resin (A) comprising 80% by mass or more of a structural unit derived from methyl methacrylate; and 90 to 1 part by mass of a block copolymer (B) comprising 10 to 60% by mass of a methacrylic acid ester polymer block (b1) and 90 to 40% by mass of an acrylic acid ester polymer block (b2), wherein the total of the methacrylic resin (A) and the block copolymer (B) is 100 parts by mass, wherein a weight-average molecular weight $Mw_{(A)}$ (hereinafter also simply referred to as "$Mw_{(A)}$") of the methacrylic resin (A), a maximum weight-average molecular weight $Mw_{(b1)}$ (hereinafter also simply referred to as "$Mw_{(b1)}$") of the methacrylic acid ester polymer block (b1), and a maximum weight-average molecular weight $Mw_{(b2)}$ (hereinafter also simply referred to as "$Mw_{(b2)}$") of the acrylic acid ester polymer block (b2) satisfy (1) and (2) below:

$$0.5 \leq Mw_{(A)}/Mw_{(b1)} \leq 2.5 \quad (1)$$

$$40000 \leq Mw_{(b2)} \leq 120000. \quad (2)$$

[2] The methacrylic resin composition according to the item [1], wherein a refractive index of the block copolymer (B) is 1.485 to 1.495.
[3] The methacrylic resin composition according to the item [1] or [2], wherein the acrylic acid ester polymer block (b2) comprises 50 to 90% by mass of a structural unit derived from an acrylic acid alkyl ester and 50 to 10% by mass of a structural unit derived from a (meth)acrylic acid aromatic ester.
[4] A shaped product composed of the methacrylic resin composition according to any one of the items [1] to [3].
[5] A platy shaped product composed of the methacrylic resin composition according to any one of the items [1] to [3].
[6] A planar light source element comprising: the platy shaped product according to the item [5] and a light source located on the edge face of the platy shaped product.
[7] The planar light source element according to the item [6], which is a front light for a display device.
[8] The planar light source element of the item [6], which is a backlight for a display device.

Advantageous Effects of the Invention

The methacrylic resin composition of the present invention is excellent in mechanical properties, surface smoothness, transparency and the like, and only small variations in haze are produced in a wide temperature range. The shaped product of the present invention, especially a platy shaped product, is suitable for various types of optical applications, among others for a planar light source element.

EMBODIMENTS FOR CARRYING OUT THE INVENTION

A methacrylic resin composition of the present invention comprises a methacrylic resin (A) and a block copolymer (B).

In the methacrylic resin (A) used in the present invention, the proportion of a structural unit derived from methyl methacrylate is not less than 80% by mass, and preferably not less than 90 by mass. Moreover, in the methacrylic resin (A), the proportion of the structural unit derived from monomers other than methyl methacrylate is not more than 20% by mass, and preferably not more than 10% by mass.

Examples of the monomers other than methyl methacrylate include acrylic acid esters such as methyl acrylate, ethyl acrylate, n-propyl acrylate, isopropyl acrylate, n-butyl acrylate, isobutyl acrylate, s-butyl acrylate, t-butyl acrylate, amyl acrylate, isoamyl acrylate, n-hexyl acrylate, 2-ethylhexyl acrylate, pentadecyl acrylate, dodecyl acrylate; phenyl acrylate, benzyl acrylate, phenoxyethyl acrylate, 2-hydroxyethyl acrylate, 2-ethoxyethyl acrylate, glycidyl acrylate, allyl acrylate; cyclohexyl acrylate, norbornenyl acrylate, isobornyl acrylate and the like; methacrylic acid esters other than methyl methacrylate such as ethyl methacrylate, n-propyl methacrylate, isopropyl methacrylate, n-butyl methacrylate, isobutyl methacrylate, s-butyl methacrylate, t-butyl methacrylate, amyl methacrylate, isoamyl methacrylate, n-hexyl methacrylate, 2-ethylhexyl methacrylate, pentadecyl methacrylate, dodecyl methacrylate; phenyl methacrylate, benzyl methacrylate, phenoxyethyl methacrylate, 2-hydroxyethyl methacrylate, 2-ethoxyethyl methacrylate, glycidyl methacrylate, allyl methacrylate; cyclohexyl methacrylate, isobornenyl methacrylate, isobornyl methacrylate and the like; unsaturated carboxylic acids such as acrylic acid, methacrylic acid, maleic anhydride, maleic acid, itaconic acid and the like; olefins such as ethylene, propylene, 1-butene, isobutylene, 1-octene and the like; conjugated dienes such as butadiene, isoprene, myrcene and the like; aromatic vinyl compounds such as styrene, α-methyl styrene, p-methyl styrene, m-methylstyrene and the like; acrylamide, methacrylamide, acrylonitrile, methacrylonitrile, vinyl acetate, vinyl pyridine, vinyl ketone, vinyl chloride, vinylidene chloride, vinylidene fluoride and the like.

The tacticity of the methacrylic resin (A) is not particularly limited. For example, the methacrylic resin (A) to be used may have tacticity such as isotactic, heterotactic or syndiotactic may be used.

The weight-average molecular weight $Mw_{(A)}$ of the methacrylic resin (A) is preferably not less than 30,000 and not more than 180,000, more preferably not less than 40,000 and not more than 150,000, particularly preferably not less than 50,000 and not more than 130,000. The impact resistance and the toughness of a shaped product obtained from the methacrylic resin composition where $Mw_{(A)}$ is lower tend to be lowered. The fluidity and the moldability of the methacrylic resin composition where $Mw_{(A)}$ is higher tend to be lowered.

The ratio $Mw_{(A)}/Mn_{(A)}$ between the weight-average molecular weight $Mw_{(A)}$ and the number-average molecular weight $Mn_{(A)}$ of the methacrylic resin (A) (hereinafter, the ratio between the weight-average molecular weight and the number-average molecular weight (weight-average molecular weight/number-average molecular weight) is also referred to as the "molecular weight distribution") is preferably not less than 1.03 and not more than 2.6, more preferably not less than 1.05 and not more than 2.3, and particularly preferably not less than 1.2 and not more than 2.0. When the molecular weight distribution is lower, the moldability of the methacrylic resin composition tends to be lowered. When the molecular weight distribution is higher, there is a tendency that the impact resistance of the shaped product obtained from the methacrylic resin composition is lowered, and that the shaped product becomes brittle.

$Mw_{(A)}$ and $Mn_{(A)}$ are standard polystyrene corresponding values that are measured by GPC (Gel Permeation Chromatography).

The molecular weight and the molecular weight distribution of the methacrylic resin can be controlled by adjusting, for example, the types and the amounts of polymerization initiator and chain transfer agent.

The methacrylic resin can be obtained by polymerizing a monomer (or monomer mixture) comprising 80 by mass or more of methyl methacrylate.

In the present invention, as the methacrylic resin (A), a commercially available methacrylic resin may be used. Examples of a commercially available methacrylic resin include "PARAPET H1000B" (MFR: 22 g/10 min (230° C., 37.3 N)), "PARAPET GF" (MFR: 15 g/10 min (230° C., 37.3 N)), "PARAPET EH" (MFR: 1.3 g/10 min (230° C., 37.3 N)), "PARAPET HRL" (MFR: 2.0 g/10 min (230° C., 37.3 N)) and "PARAPET G" (MFR: 8.0 g/10 min (230° C., 37.3 N)), [all of which are names of products made by Kuraray Co., Ltd.].

The block copolymer (B) used in the present invention comprises a methacrylic acid ester polymer block (b1) and an acrylic acid ester polymer block (b2). The block copolymer (B) may comprise one methacrylic acid ester polymer block (b1) or a plurality of methacrylic acid ester polymer blocks (b1). The block copolymer (B) may comprise one acrylic acid ester polymer block (b2) or a plurality of acrylic acid ester polymer blocks (b2).

The methacrylic acid ester polymer block (b1) comprises a structural unit derived from methyl methacrylate as a main structural unit. The proportion of the structural unit derived from methyl methacrylate in the methacrylic acid ester polymer block (b1) is preferably not less than 80% by mass, more preferably not less than 90% by mass, further preferably not less than 95% by mass, and particularly preferably not less than 98% by mass.

Examples of the methacrylic acid ester include methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate, 2-methoxyethyl methacrylate, glycidyl methacrylate, allyl methacrylate and the like. Among them, in terms of improving the transparency and the heat resistance, methacrylic acid alkyl esters such as methyl methacrylate, ethyl methacrylate, isopropyl methacrylate, n-butyl methacrylate, tert-butyl methacrylate, cyclohexyl methacrylate, isobornyl methacrylate or the like are preferable, and methyl methacrylate is more preferable. The methacrylic acid ester can be polymerized either alone or in combination thereof to form the methacrylic acid ester polymer block (b1).

The methacrylic acid ester polymer block (b1) may comprise a structural unit derived from a monomer other than the methacrylic acid ester as long as the object and the effect of the present invention are not hindered. The proportion of the structural unit derived from the monomer other than the methacrylic acid ester comprised in the methacrylic acid ester polymer block (b1) is preferably not more than 20% by mass, more preferably not more than 10% by mass, further preferably not more than 5% by mass, and particularly preferably not more than 2% by mass.

Examples of the monomer other than the methacrylic acid ester include acrylic acid esters, unsaturated carboxylic acids, aromatic vinyl compounds, olefins, conjugated dienes, acrylonitrile, methacrylonitrile, acrylamide, methacrylamide, vinyl acetate, vinyl pyridine, vinyl ketone, vinyl chloride, vinylidene chloride, vinylidene fluoride or the like. The monomer other than the methacrylic acid ester can be copolymerized either alone or in combination thereof with the methacrylic acid ester described above to form the methacrylic acid ester polymer block (b1).

The methacrylic acid ester polymer block (b1) is preferably composed of a polymer whose refractive index falls within a range of 1.485 to 1.495 in terms of improving the transparency of the methacrylic resin composition.

The weight-average molecular weight of the methacrylic acid ester polymer block (b1) is preferably not less than 5,000 and not more than 150,000, more preferably not less than 8,000 and not more than 120,000, and further preferably not less than 12,000 and not more than 100,000.

When a plurality of methacrylic acid ester polymer blocks (b1) are comprised in the block copolymer (B), the structural units of the methacrylic acid ester polymer blocks (b1) may be the same as or different from each other in composition ratio and molecular weight.

The maximum weight-average molecular weight $Mw_{(b1)}$ of the methacrylic acid ester polymer block (b1) is preferably not less than 12,000 and not more than 150,000, more preferably not less than 15,000 and not more than 120,000, and further preferably not less than 20,000 and not more than 100,000. When only one methacrylic acid ester polymer block (b1) is comprised in the block copolymer (B), the weight-average molecular weight of the methacrylic acid ester polymer block (b1) is $Mw_{(b1)}$. When a plurality of methacrylic acid ester polymer blocks (b1) are comprised in the block copolymer (B), and the weight-average molecular weights of the methacrylic acid ester polymer blocks (b1) are equal to each other, the weight-average molecular weight is $Mw_{(b1)}$.

In the methacrylic resin composition of the present invention, the ratio of the weight-average molecular weight $Mw_{(A)}$ of the methacrylic resin (A) to $Mw_{(b1)}$, that is, $Mw_{(A)}/Mw_{(b1)}$, is not less than 0.5 and not more than 2.5, preferably not less than 0.6 and not more than 2.3, and more preferably not less than 0.7 and not more than 2.2. When $Mw_{(A)}/Mw_{(b1)}$ drops below 0.5, the impact resistance of the shaped product produced from the methacrylic resin composition tends to be lowered. On the other hand, when $Mw_{(A)}/Mw_{(b1)}$ is excessively high, the surface smoothness and the temperature dependence of haze of the shaped product produced from the methacrylic resin composition tend to be degraded. When $Mw_{(A)}/Mw_{(b1)}$ falls within the above range, since the diameter of the particles of the block copolymer (B) dispersed in the methacrylic resin (A) is low, haze is low regardless of variations in temperature, with the result that it is thought that small variations in haze are produced in a wide temperature range.

In terms of the transparency, the bendability, the moldability and the surface smoothness, the proportion of the methacrylic acid ester polymer block (b1) in the block copolymer (B) is preferably not less than 10% by mass and not more than 60% by mass, and more preferably not less than 20% by mass and not more than 55% by mass. When the proportion of the methacrylic acid ester polymer block (b1) in the block copolymer (B) falls within the above range, the methacrylic resin composition of the present invention or the shaped product made thereof is excellent in transparency, flexibility, bending resistance, impact resistance, bendability and the like. When a plurality of methacrylic acid ester polymer blocks (b1) are comprised in the block copolymer (B), the proportion described above is calculated based on the total mass of all the methacrylic acid ester polymer blocks (b1).

The acrylic acid ester polymer block (b2) comprises a structural unit derived from an acrylic acid ester as a main structural unit. The proportion of the structural unit derived from the acrylic acid ester in the acrylic acid ester polymer block (b2) is preferably not less than 45% by mass, more preferably not less than 50% by mass, further preferably not less than 60% by mass, and particularly preferably not less than 90% by mass.

Examples of the acrylic acid ester include methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate, 2-methoxyethyl acrylate, glycidyl acrylate, allyl acrylate, or the like. The acrylic acid ester can be polymerized either alone or in combination thereof to form the acrylic acid ester polymer block (b2).

The acrylic acid ester polymer block (b2) may comprise a structural unit derived from a monomer other than the acrylic acid ester as long as the object and the effect of the present invention are not hindered. The proportion of the structural unit derived from the monomer other than the acrylic acid ester comprised in the acrylic acid ester polymer block (b2) is preferably not more than 55% by mass, more preferably not more than 50% by mass, further preferably not more than 40% by mass, and particularly preferably not more than 10% by mass.

Examples of the monomer other than the acrylic acid ester include methacrylic acid esters, unsaturated carboxylic acids, aromatic vinyl compounds, olefins, conjugated dienes, acrylonitrile, methacrylonitrile, acrylamide, methacrylamide, vinyl acetate, vinyl pyridine, vinyl ketone, vinyl chloride, vinylidene chloride, vinylidene fluoride or the like. The monomer other than the acrylic acid ester can be copolymerized either alone or in combination thereof with the acrylic acid ester to form the acrylic acid ester polymer block (b2).

In terms of improving the transparency and the like of the methacrylic resin composition in the present invention, the acrylic acid ester polymer block (b2) is preferably formed of an acrylic acid alkyl ester and a (meth)acrylic acid aromatic ester.

Examples of the acrylic acid alkyl ester include methyl acrylate, ethyl acrylate, isopropyl acrylate, n-butyl acrylate, 2-ethylhexyl acrylate, dodecyl acrylate or the like. Among them, n-butyl acrylate or 2-ethylhexyl acrylate is preferable.

The (meth)acrylic acid aromatic ester means an acrylic acid aromatic ester or a methacrylic acid aromatic ester. The (meth)acrylic acid aromatic ester is formed by the ester bonding of an aromatic ring-containing compound to a (meth)acrylic acid. Examples of the (meth)acrylic acid aromatic ester include phenyl acrylate, benzyl acrylate, phenoxyethyl acrylate, styryl acrylate, phenyl methacrylate, benzyl methacrylate, phenoxyethyl methacrylate, styryl methacrylate or the like. Among them, phenyl methacrylate, benzyl methacrylate, phenoxyethyl methacrylate or benzyl acrylate is preferable.

When the acrylic acid ester polymer block (b2) is formed of an acrylic acid alkyl ester and a (meth)acrylic acid aromatic ester, the acrylic acid ester polymer block (b2) preferably comprises 50 to 90% by mass of a structural unit derived from the acrylic acid alkyl ester and 50 to 10% by mass of a structural unit derived from the (meth)acrylic acid aromatic ester, and more preferably comprises 60 to 80% by mass of the structural unit derived from the acrylic acid alkyl ester and 40 to 20% by mass of the structural unit derived from the (meth)acrylic acid aromatic ester.

The acrylic acid ester polymer block (b2) is preferably composed of a polymer whose refractive index falls within a range of 1.485 to 1.495 in terms of improving the transparency of the methacrylic resin composition.

The weight-average molecular weight of the acrylic acid ester polymer block (b2) is preferably not less than 5,000 and not more than 120,000, more preferably not less than 15,000 and not more than 110,000, and further preferably not less than 40,000 and not more than 100,000.

When a plurality of acrylic acid ester polymer blocks (b2) are comprised in the block copolymer (B), the structural units of the acrylic acid ester polymer blocks (b2) may be the same as or different from each other in composition ratio and molecular weight.

The maximum weight-average molecular weight $Mw_{(b2)}$ of the acrylic acid ester polymer block (b2) is not less than 40,000 and not more than 120,000, preferably not less than 45,000 and not more than 120,000, and more preferably not less than 50,000 and not more than 100,000. When $Mw_{(b2)}$ is lower, the impact resistance of the shaped product produced from the methacrylic resin composition tends to be lowered. On the other hand, when $Mw_{(b2)}$ is higher, the surface smoothness of the shaped product produced from the methacrylic resin composition tends to be lowered. When only one acrylic acid ester polymer block (b2) is comprised in the block copolymer (B), the weight-average molecular weight of the acrylic acid ester polymer block (b2) is $Mw_{(b2)}$. When a plurality of methacrylic acid ester polymer blocks (b2) are comprised in the block copolymer (B), and the weight-average molecular weights of the methacrylic acid ester polymer blocks (b2) are equal to each other, the weight-average molecular weight is $Mw_{(b2)}$.

The weight-average molecular weight of the methacrylic acid ester polymer block (b1) and the weight-average molecular weight of the acrylic acid ester polymer block (b2) are values that are calculated in the process of manufacturing the block copolymer (B) from the weight-average molecular weight of an intermediate product and an end product (the block copolymer (B)) measured by performing sampling during or after the polymerization. The weight-average molecular weights are standard polystyrene corresponding values that are measured by GPC (Gel Permeation Chromatography).

In terms of the transparency, the bendability, the moldability and the surface smoothness, the proportion of the acrylic acid ester polymer block (b2) in the block copolymer (B) is preferably not less than 40% by mass and not more than 90% by mass, and more preferably not less than 45% by mass and not more than 80% by mass. When the proportion of the acrylic acid ester polymer block (b2) in the block copolymer (B) falls within the above range, the methacrylic resin composition of the present invention or the shaped product made thereof is excellent in impact resistance, bendability and the like. When a plurality of acrylic acid ester polymer blocks (b2) are comprised in the block copolymer (B), the proportion described above is calculated based on the total mass of all the acrylic acid ester polymer blocks (b2).

The block copolymer (B) is not particularly limited to the configuration of the methacrylic acid ester polymer block (b1) and the acrylic acid ester polymer block (b2). Examples thereof include block copolymers having a structure where the methacrylic acid ester polymer block (b1) and the acrylic acid ester polymer block (b2) are connected in series, such as a copolymer in which one end of the acrylic acid ester polymer block (b2) is connected to one end of the methacrylic acid ester polymer block (b1) (di-block copolymer of (b1)-(b2) structure); a copolymer in which one end of the acrylic acid ester polymer blocks (b2) is respectively connected to both ends of the methacrylic acid ester polymer block (b1) (tri-block copolymer of (b2)-(b1)-(b2) structure); and a copolymer in which one end of the methacrylic acid ester polymer block (b1) is respectively connected to both ends of the acrylic acid ester polymer block (b2) (tri-block copolymer of (b1)-(b2)-(b1) structure).

Examples thereof also include star-shaped block copolymers such as a block copolymer ([(b1)-(b2)-]$_n$X structure) formed in a radial structure by connecting one ends of a plurality of block copolymers having (b1)-b2) structure; a block copolymer ([(b2)-(b1)-]$_n$X structure) formed in a radial structure by connecting one ends of a plurality of block copolymers having (b2)-(b1) structure; a block copolymer ([(b1)-(b2)-(b1)-]$_n$X structure) formed in a radial structure by connecting one ends of a plurality of block copolymers having (b1)-(b2)-(b1) structure; and a block copolymer ([(b2)-(b1)-(b2)-]$_n$X structure) formed in a radial structure by connecting one ends of a plurality of block copolymers having (b2)-(b1)-(b2) structure, or block copolymers having a branch structure. Here, X represents a coupling agent residue.

Among them, the di-block copolymer, the tri-block copolymer or the star-shaped block copolymer is preferable, and the di-block copolymer having (b1)-(b2) structure, the tri-block copolymer having (b1)-(b2)-(b1) structure, the star-shaped block copolymer having [(b1)-(b2)-]$_n$X structure or the star-shaped block copolymer having [(b1)-(b2)-(b1)-]$_n$X structure is more preferable.

The block copolymer (B) may also be a block copolymer further comprising a polymer block (b3) other than the methacrylic acid ester polymer block (b1) and the acrylic acid ester polymer block (b2).

The main structural unit of the polymer block (b3) is a structural unit derived from a monomer other than the methacrylic acid ester and the acrylic acid ester. Examples of the monomer described above include: olefins such as ethylene, propylene, 1-butene, isobutylene, 1-octene and the like; conjugated dienes such as butadiene, isoprene, myrcene and the like; aromatic vinyl compounds such as styrene, α-methyl styrene, p-methyl styrene, m-methylstyrene and the like; vinyl acetate, vinyl pyridine, acrylonitrile, methacrylonitrile, vinyl ketone, vinyl chloride, vinylidene chloride, vinylidene fluoride, acrylamide, methacrylamide, ε-caprolactone, valerolactone and the like.

The configuration of the methacrylic acid ester polymer block (b1), the acrylic acid ester polymer block (b2) and the polymer block (b3) in the block copolymer (B) is not particularly limited. Examples of the configuration of the block copolymer (B) composed of the methacrylic acid ester polymer block (b1), the acrylic acid ester polymer block (b2) and the polymer block (b3) include a block copolymer having (b1)-(b2)-(b1)-(b3) structure, a block copolymer having (b3)-(b1)-(b2)-(b1)-(b3) structure, and the like. When a plurality of polymer blocks (b3) are comprised in the block copolymer (B), the respective structural units of the polymer blocks (b3) may be the same as or different from each other in composition ratio and molecular weight.

The block copolymer (B) may have, as necessary, in a molecular chain or a molecular chain end, a functional group such as a hydroxyl group, a carboxyl group, an acid anhydride, an amino group or the like.

The weight-average molecular weight $Mw_{(B)}$ of the block copolymer (B) is preferably not less than 52,000 and not more than 400,000, and more preferably not less than 60,000 and not more than 300,000.

When the weight-average molecular weight of the block copolymer (B) is lower, there is a tendency that a sufficient melt tension cannot be retained in melt extrusion molding, it is difficult to obtain a satisfactory platy shaped product, and mechanical properties such as the breaking strength of the obtained platy shaped product is lowered. On the other hand, when the weight-average molecular weight of the block copolymer (B) is higher, there is a tendency that the viscosity of the molten resin is increased, minute grainy bumps on the surface of the platy shaped product obtained by melt extrusion molding or foreign particles caused by an unmelted part (a polymer having high molecular weight) are formed in the platy shaped product, and it is difficult to obtain a satisfactory platy shaped product.

The molecular weight distribution of the block copolymer (B) is preferably not less than 1.0 and not more than 2.0, and more preferably not less than 1.0 and not more than 1.6. With the molecular weight distribution falling within this range, it is possible to extremely reduce the content of the unmelted part being cause of foreign particles, in the shaped product composed of the methacrylic resin composition of the present invention.

The weight-average molecular weight and the number-average molecular weight are standard polystyrene corresponding values that are measured by GPC (Gel Permeation Chromatography).

The refractive index of the block copolymer (B) is preferably 1.485 to 1.495, and more preferably 1.487 to 1.493. When the refractive index falls within the range, the transparency of the methacrylic resin composition is increased. The "refractive index" in the present specification means a value that is measured with a measurement wavelength of 587.6 nm (d line) as in EXAMPLES which will be described later.

A method for manufacturing the block copolymer (B) is not particularly limited, and a method corresponding to a known method can be employed. For example, a method of subjecting the monomer composing the polymer block to living polymerization is usually used. Examples of the technique of the living polymerization include: a technique which perform anionic polymerization is performed in the presence of a mineral acid salt of an alkali metal or an alkaline earth metal or the other using an organic alkali metal compound as a polymerization initiator; a technique that anionic polymerization is performed in the presence of an organic aluminum compound using an organic alkali metal compound as a polymerization initiator; a technique that polymerization is performed using an organic rare earth metal complex as a polymerization initiator; a technique that radical polymerization is performed in the presence of a copper compound using α-halogenated ester compound as an initiator or the like. Examples thereof also include a technique that the monomers for the each block are polymerized using a polyvalent radical polymerization initiator or a polyvalent radical chain transfer agent to manufacture a mixture containing the block copolymer (B) used in the present invention. Among these methods, in particular, since it is possible to obtain the block copolymer (B) in high purity, it is easy to control the molecular weight and the composition ratio, and it is economical, the technique that anionic polymerization is performed in the presence of an organic aluminum compound using an organic alkali metal compound as a polymerization initiator is preferable.

The methacrylic resin composition of the present invention comprises 10 to 99 parts by mass of the methacrylic resin (A) and 90 to 1 part by mass of the block copolymer (B), preferably comprises 15 to 95 parts by mass of the methacrylic resin (A) and 85 to 5 parts by mass of the block copolymer (B), and more preferably comprises 20 to 90 parts by mass of the methacrylic resin (A) and 80 to 10 parts by mass of the block copolymer (B).

When the content of the methacrylic resin (A) is lower than that of the block copolymer (B) in the methacrylic resin composition, there is a tendency that minute linear convexo-concave are produced on the surface of the platy shaped product obtained by melt extrusion molding with a T die, which results that it is not easy to obtain the platy shaped product having satisfactory surface smoothness. On the other hand, when the content of the methacrylic resin (A) is higher than that of the block copolymer (B), there is a tendency that the tensile elastic modulus of the methacrylic resin composition or the platy shaped product made thereof is increased, which results that the bendability is lowered.

As necessary, various additives may be comprised in the methacrylic resin composition of the present invention. Since the too high content of the additives may lead to defective appearance such as silver streak or the like in the shaped product, the content is preferably not more than 1% by mass.

Examples of the additives include thermal stabilizers, antioxidants, thermal deterioration inhibitors, ultraviolet absorbers, light stabilizers, lubricants, mold release agents, inorganic fillers, inorganic fibers or organic fibers, mineral oil softeners, polymer processing aids, antistatic agents, flame retardants, dyes and pigments, colorants, delusterants, light-diffusing agents, impact resistance modifiers, fluorescent substances, adhesives, tackifiers, plasticizers, foaming agents and the like.

The antioxidants are those having, under the presence of oxygen, an effect of preventing the oxidation degradation of a resin. Examples thereof include phosphorus antioxidants, hindered phenolic antioxidants, thioether antioxidants and the like. These antioxidants can be used either alone or in combination thereof. Among them, in terms of an effect of preventing the degradation of optical properties by coloring, a phosphorus antioxidant or a hindered phenolic antioxidant is preferable, and a phosphorus antioxidant and a hindered phenolic antioxidant are more preferably used together.

When a phosphorus antioxidant and a hindered phenolic antioxidant are used together, though the ratio thereof is not particularly limited, the mass ratio of the phosphorus antioxidant/the hindered phenolic antioxidant is preferably 1/5 to 2/1, and more preferably 1/2 to 1/1.

Examples of the phosphorus antioxidants include 2,2-methylenebis(4,6-di-t-butylphenyl)octyl phosphite (made by Asahi Denka Co., Ltd; product name: ADEKASTAB HP-10), tris(2,4-di-t-butylphenyl)phosphite (made by Chiba Specialty Chemicals; product name: IRUGAFOS168) and the like.

Examples of the hindered phenolic antioxidants include pentaerythrityl-tetrakis[3-(3,5-di-t-butyl-4-hydroxyphenyl) propionate] (made by Chiba Specialty Chemicals; product name: IRGANOX1010), octadecyl-3-(3,5-di-t-butyl-4-hydroxyphenyl) propionate (made by Chiba Specialty Chemicals; product name: IRGANOX1076), 3,9-bis(2,6-di-tert-butyl-4-methylphenoxy)-2,4,8,10-tetraoxa-3,9-diphosphaspiro[5.5]undecane (made by ADEKA Co., Ltd; product name: ADEKASTAB PEP-36) and the like.

The thermal degradation inhibitors are those which can prevent thermal deterioration of the resin by trapping polymer radicals generated when exposed to intense heat under a substantially oxygen-free condition.

Examples of the thermal degradation inhibitors include 2-t-butyl-6-(3'-t-butyl-5'-methyl-hydroxybenzyl)-4-methylphenyl acrylate (made by Sumitomo Chemical Co, Ltd.; product name: SUMILIZER GM), 2,4-di-t-amyl-6-(3',5'-di-t-amyl-2'-hydroxy-α-methylbenzyl)phenyl acrylate (made by Sumitomo Chemical Co, Ltd.; product name: SUMILIZER GS) and the like.

The ultraviolet absorbers are compounds capable of absorbing ultraviolet rays. The ultraviolet absorbers are compounds that are said to have the function of mainly converting light energy into thermal energy.

Examples of the ultraviolet absorbers include benzophenones, benzotriazoles, triazines, benzoates, salicylates, cyanoacrylates, oxaldianilides, malonic acid esters, formamidines and the like. These can be used either alone or in combination thereof. Among them, benzotriazoles or anilides are preferable.

Examples of the benzotriazoles include 2-(2H-benzotriazole-2-yl)-4-(1,1,3,3-tetramethylbutyl) phenol (made by Chiba Specialty Chemicals; product name: TINUVIN329), 2-(2H-benzotriazol-2-yl)-4,6-bis(1-methyl-1-phenylethyl) phenol (made by Chiba Specialty Chemicals; product name: TINUVIN234) and the like.

Examples of the anilides include 2-ethyl-2'-ethoxy-oxalanilide (made by Clariant Japan K.K.; product name: SANDEYUBOA VSU) and the like.

Among these ultraviolet absorbers, in terms of reducing the degradation of a resin by exposure to ultraviolet rays, the benzotriazoles are most preferably employed.

The light stabilizers are compounds which are said to have the function of trapping radicals generated by oxidation mainly due to light. Examples of the preferable light stabilizer include hindered amines such as a compound having a 2,2,6,6-tetraalkyl piperidine skeleton or the like.

The mold release agents are compounds having the function of facilitating the release of a shaped product from a mold. Examples of the mold release agent include higher alcohols such as cetyl alcohol, stearyl alcohol and the like; glycerol higher fatty acid esters such as stearic acid monoglycerides, stearic acid diglycerides and the like. In the present invention, as the mold release agent, a higher alcohol and a glycerin fatty acid monoester are preferably used together. When a higher alcohol and a glycerin fatty acid monoester are used together, though the ratio thereof is not particularly limited, the mass ratio of the higher alcohol/the glycerin fatty acid monoester is preferably 2.5/1 to 3.5/1, and more preferably 2.8/1 to 3.2/1.

The polymer processing aids are compounds which are effective for thickness accuracy and thinning when the methacrylic resin composition is molded. The polymer processing aid can be generally manufactured by an emulsion polymerization method. The polymer processing aid is polymer particles having a particle diameter of preferably 0.05 to 0.5 µm.

The polymer particles may be single-layer particles consisting of a single polymer having a single composition ratio and a single limiting viscosity, or may be multilayer particles consisting of two or more polymers having different composition ratios or different limiting viscosities. Among them, the particles of a two-layer structure having a polymer layer having a low limiting viscosity as an inner layer and a polymer layer having a high limiting viscosity of 5 dl/g or more as an outer layer are preferred.

The polymer processing aid preferably has an limiting viscosity of 3 to 6 dl/g. When the limiting viscosity is excessively low, the effect of improving moldability is low. When the limiting viscosity is excessively high, the melt fluidity of the methacrylic resin composition is easily lowered.

In the methacrylic resin composition of the present invention, an impact resistance modifier may be used. Examples of the impact resistance modifier include a core shell-type modifier comprising an acrylic rubber or a diene rubber as a core layer component, a modifier comprising a plurality of rubber particles and the like.

As an organic dye, a compound that has the function of converting ultraviolet rays, which are harmful to a resin, into visible light is preferably used.

Examples of the light diffusing agent and the delusterant include glass particulates, polysiloxane crosslinked particulates, crosslinked polymer particulates, talc, calcium carbonate, barium sulfate and the like.

Examples of the fluorescent substances include fluorescent pigments, fluorescent dyes, fluorescent white dyes, fluorescent brightening agents, fluorescent bleaches and the like.

A mineral oil softener is used to improve the fluidity at the time of forming processing. Examples thereof include paraffinic oils, naphthenic oils and the like.

Examples of the inorganic filler include calcium carbonate, talc, carbon black, titanium oxide, silica, clay, barium sulfate, magnesium carbonate and the like. Examples of a fibrous filler include glass fiber, carbon fiber and the like.

The methacrylic resin composition of the present invention can be used to be mixed with a polymer other than the methacrylic resin (A) and the block copolymer (B) as long as the effect of the present invention is not compromised. Examples of the other polymers include polyolefin resins such as polyethylene, polypropylene, polybutene-1, poly-4-methyl-pentene-1, polynorbornene and the like; ethylene ionomers; styrenic resins such as polystyrene, styrene-maleic anhydride copolymers, high impact polystyrenes, AS resins, ABS resins, AES resins, AAS resins, ACS resins, MBS resins and the like; methyl methacrylate-styrene copolymers; polyester resins such as polyethylene terephthalate, polybutylene terephthalate and the like; polyamides such as nylon 6, nylon 66, polyamide elastomers and the like; polycarbonate, polyvinyl chloride, polyvinylidene chloride, polyvinyl alcohol, ethylene-vinyl alcohol copolymers, polyacetal, polyvinylidene fluoride, polyurethanes, modified polyphenylene ethers, polyphenylene sulfide, silicone-modified resins; acrylic rubbers, silicone rubbers; styrenic thermoplastic elastomers such as SEPS, SEBS, SIS and the like; and olefin rubbers such as IR, EPR, EPDM and the like.

In the methacrylic resin composition of the present invention, a melt flow rate under the conditions of 230° C. and 37.3 N in conformity with ISO 1173 is preferably 0.6 g/10 min or more, more preferably 1 to 20 g/10 min or more, and further preferably 1.5 to 10 g/10 min or more.

A method for preparing the methacrylic resin composition of the present invention is not particularly limited. As the method, for instance, mentioned are a method that a monomer mixture comprising methyl methacrylate is polymerized in the presence of the block copolymer (B) to generate the methacrylic resin (A); a method that the block copolymer (B) and the methacrylic resin (A) are molten-kneaded, and the like. Among them, since the melt-kneading method is simple, it is preferable. At the time of melt-kneading, as necessary, another polymer or an additive may be compounded, and after the block copolymer (B) is mixed with another polymer or an additive, the mixture may be mixed with the methacrylic resin (A) or after the methacrylic resin (A) is mixed with another polymer or an additive, the mixture may be mixed with the block copolymer (B). The kneading can be performed using, for example, a known mixing device or kneading device such as a kneader ruder, an extruder, a mixing roll, a banbury mixer or the like. Among them, a twin-screw extruder is preferable. Although the temperature at the time of mixing and kneading can be adjusted as necessary according to the melting temperature of the block copolymer (B) and the methacrylic resin (A) used or the like, the temperature is preferably 110° C. to 300° C. The methacrylic resin composition of the present invention prepared by the method described above can be shaped in any form such as pellets, granules, powder or the like to be used as a forming material.

The methacrylic resin composition of the present invention described above may be melted, heated and formed with a conventionally known method such as injection molding (including an insert method, a dichroic method, a press method, a core back method, a sandwich method and the like), compression molding, extrusion molding, vacuum molding, blow molding, inflation forming, calendering, or the like to obtain various types of shaped products. Although the shape of the shaped product is not particularly limited, the platy shaped product is preferably used in applications which will be described later. Here, the concept of the platy shaped product includes a sheet and a film.

The applications of the shaped product composed of the methacrylic resin composition in the present invention include, for example, signboard components such as advertising towers, stand signboards, side signboards, transom signboards and rooftop signboards; display components such as showcases, partition plates and store displays; lighting components such as fluorescent lamp covers, mood illumination covers, lamp shades, luminous ceilings, light walls and chandeliers; interior components such as pendants and mirrors; building components such as doors, domes, safety window glasses, partitions, stairs wainscots, balcony wainscots and roofs of building for leisure; transport-related components such as aircraft windshields, pilot visors, motorcycles, motorboat windshields, bus light shielding plates, automotive side visors, rear visors, head wing and headlight covers; electronics components such as audio visual tablets, stereo covers, TV protective masks and vending machine display covers; medical equipment components such as incubators and X-ray components; equipment-related components such as machine covers, meter covers, experimental equipment, rulers, dials and observation windows; optical-related components such as light guide plates or films for front light in a display device, light guide plates or films for backlight in a display device, liquid crystal protective plates, Fresnel lens, lenticular lens, front plates for various displays and diffuser plates; traffic-related components such as road signs, guide plates, curve mirrors and sound barriers; film components such as surface materials for automobile interiors, surface materials for mobile phones and marking films; household electric appliance components such as top cover members and control panels of washing machines and top panels of rice cookers; and also greenhouses, large water tanks, box water tanks, clock panels, bathtubs, sanitary components, desk mats, game components, toys, face protective masks of welding and the like.

The shaped product, preferably the platy shaped product, of the present invention is composed of the methacrylic resin composition in the present invention described above. The platy shaped product include a platy shaped product having a thickness of not less than 0.005 mm and not more than 0.25 mm (which may be called a film), or a platy shaped product having a thickness of more than 0.25 mm (which may be called a sheet). In terms of bendability and the like, the thickness of the platy shaped product of the present invention is preferably not less than 0.025 mm and not more than 10 mm, and more preferably not less than 0.05 mm and not more than 5 mm.

The platy shaped product of the present invention has the average light transmittance of preferably not less than 50% determined by spectral light transmittance measurement method using D65 light source under conditions of a view angle of 2 degrees, a measurement temperature of 25° C., a light wavelength of 400 to 500 nm, and an optical path length of 150 mm. In the platy shaped product of the present invention, the difference between the average light transmittance in the wavelength of 400 to 500 nm and the average light transmittance in the wavelength of 501 to 780 nm is preferably not more than 25%, and more preferably not more than 20%. The platy shaped product described above is suitable as an optical member for guiding light from an edge face, for example, as a light guide plate.

The shaped product, preferably the platy shaped product, of the present invention may be subjected to stretching processing. The mechanical strength can be improved by the stretching processing, and thus it is possible to obtain a platy shaped article that is difficult to crack. The stretching method is not particularly limited, and examples thereof include a simultaneous biaxial stretching method, a sequential biaxial stretching method, a tubular stretching method, a rolling method and the like. With respect to the temperature at the time of stretching, in terms of performing uniform stretching and obtaining a high-strength platy shaped article, the lower limit is a temperature that is 10° C. higher than the glass transition temperature of the methacrylic resin, and the upper limit is a temperature that is 40° C. higher than the glass-transition temperature of the methacrylic resin. When the stretching temperature is excessively low, the shaped product is easily broken during the stretching. When the stretching temperature is excessively high, the effect of the stretching processing is not sufficiently achieved, and thus the strength of the shaped article is unlikely to be increased. The stretching is generally performed at a rate of 100%/min to 5000%/min. When the stretching rate is low, the strength is unlikely to be increased, and the productivity is lowered. When the stretching rate is high, the shaped product may be broken, and thus it may be difficult to perform uniform stretching. After the stretching, thermal fixing is preferably performed. By thermal fixing, it is possible to obtain a platy shaped article having small heat shrinkability. The thickness of the platy shaped article obtained by performing the stretching is preferably 10 to 200 μm.

Another material can be laminated on the platy shaped product by a method such as fusion, gluing, coating, printing or the like. Examples thereof include hard coating materials, anti-reflective materials, antidazzle materials, organic compounds or compositions such as liquid crystal, organic polymers or compositions such as cyclic olefin ring-opening polymers or the hydrogenated products thereof, cyclic olefin addition polymers, aliphatic olefin resins, acrylic polymers, polycarbonate resins, a liquid crystal polymer or the like, inorganic substances or compositions such as soda glass, quartz glass or the like. In order to laminate the platy shaped product and the other material, a known primer may be applied or corona discharge processing, plasma processing or the like may be performed. In the platy shaped product, according to the application, the main surface may be a flat surface or may be a concave-convex surface in which grooves, ridges, protrusions, holes and the like are formed.

The platy shaped product of the present invention is excellent in surface smoothness and mechanical properties, is excellent in bendability and is excellent in optical properties such as the light transmittance of short-wavelength light. It can be suitably employed to various optical applications. It can be suitably employed to, for example, various types of covers, various types of terminal plates, printed circuit boards, speakers, microscopes, binoculars, cameras, watches and the like; As optical devices, video/optical recording/optical communication/information device-related parts, finders such as for cameras, VTRs, projection TVs and the like, filters, prisms, Fresnel lenses, protective films for various types of optical disks (VDs, CDs, DVDs, MDs, LDs and the like) substrates, optical switches, optical connectors, liquid crystal displays, light guide films or sheets for liquid crystal display, flat panel displays, light guide films or sheets for flat panel display, plasma displays, light guide films or sheets for plasma display, light guide films or sheets for electronic paper, phase difference films or sheets, polarizing films or sheets, polarizing plate protective films or sheets, wave plates, light diffusion films or sheets, prism films or sheets, reflective films or sheets, anti-reflection films or sheets, wide viewing angle films or sheets, anti-glare films or sheets, brightness enhancement films or sheets, display element substrates for liquid crystal or electroluminescence, touch panels, light guide films or sheets for touch panel, spacers between various types of front plates and various types of modules or the like. Specifically, the platy shaped product can be used in, for example, mobile phones, digital information terminals, pagers, navigations, various types of liquid crystal display elements such as for vehicle-mounted liquid crystal displays, liquid crystal monitors, dimming panels, OA device displays and AV device displays, electroluminescence display elements, touch panels or the like. Since the platy shaped product is excellent in weatherability, bendability and the like, it can be suitably employed to known construction material applications such as architectural interior and exterior members, curtain walls, roofing members, window members, gutters, exteriors, wall materials, flooring materials, building materials, road construction members, retroreflective films or sheets, agricultural films or sheets, lighting covers, signboards, translucent sound insulation walls or the like.

The planar light source element of the present invention comprises the platy shaped product of the present invention and a light source located on an edge face of the platy shaped product. Examples of the light source include an LED, a cold-cathode tube and the like. The planar light source element can be used as a backlight or a front light for a display device.

The light guide plate which is one of the planar light source elements of the present invention is an element for guiding light such that light entering the edge face of the plate is reflected off the back surface of the plate and that the light is emitted from the front surface of the plate. In the back surface of the light guide plate, convexoconcave, a white reflective material or the like for reflecting light are placed. In the front surface of the light guide plate, as necessary, a prism, an arc-shaped linear convex portion or the like are placed.

The convexoconcave for reflecting light can be formed by a known method such as fusion, gluing, coating, printing, injection molding, laser beam machining or the like. The convexoconcave are designed, based on factors such as the size or thickness of the light guide plate and the distance from the edge face of the light guide plate to the light source, such that the size, the shape, the arrangement and the spacing of the convex portion or the concave portion thereof are an optimum structure. Examples of the shape of the convexoconcave include a dot pattern in the shape of a true circle or an ellipse, a linear pattern in the shape of a rectangle or a V-notch, convexoconcave in the shape of a hemispherical lens, a grainy pattern or the like. The convexoconcave formed within one light guide plate may have a pattern in which the same shape and the same size are repeated, may have a pattern in which different shapes are combined or may have a pattern in which the same shape and different sizes are repeated. The size of the convex portion or the concave portion in the convexoconcave can be set such that, for example, the width is 1 to 600 μm, the length is 2 to 1200 μm and the height or depth is 1 to 500 μm. The distance between the center points of the concave portion and the convex portion adjacent to each other is preferably 2 to 10000 μm. The size and the spacing of the convex portion and the concave portion can be selected according to the required light guide performance, the productivity and the ability of the manufacturing device. In general, when the size of the concave portion or the convex portion is excessively large or the spacing is widely opened, unevenness in the intensity of light emitted from the front surface is produced or the intensity of light emitted to the front surface is reduced, with the result that the quality of the display tends to be lowered. By contrast, although the size of the concave portion or the convex portion is reduced or the spacing is narrowed and thus unevenness can be reduced, since high accuracy is required for the formation of the convexoconcave, there is a tendency that the productivity is lowered and that the cost is increased.

In general, the white reflective material can be placed by printing (for example, screen printing). The white reflective material is designed, based on factors such as the size and thickness of the light guide plate and the distance from the edge face of the light guide plate to the light source, such that the size of the white reflective material, the shape, the arrangement, the spacing and the like are an optimum structure. The width or the length of the white reflective material is preferably 500 to 5000 μm, and the distance between the center points of the white reflective material is preferably 1000 to 5000 μm. The size and the spacing of the white reflective material can be selected according to the required light guide performance, the productivity and the ability of the manufacturing device. In general, when the size of the white reflective material is excessively large or the spacing is widely opened, unevenness in the intensity of light emitted from the front surface is produced or the intensity of light emitted to the front surface is reduced, with the result that the quality of the display tends to be lowered. By contrast, although the size of the white reflective material is reduced or the spacing is narrowed and thus unevenness can be reduced, since high accuracy is required for printing, there is a tendency that the productivity is lowered and that the cost is increased.

The light guide plate can be used as a backlight of a liquid crystal display or the like. In the backlight, a light reflective sheet can be placed on the side of the back surface of the light guide plate, and a light diffusion sheet, a prism sheet and the like can be placed on the side of the front surface of the light guide plate.

EXAMPLES

The present invention will be more specifically described below with reference to examples and comparative examples. The present invention is not limited to the following examples. The present invention includes all aspects that are formed by arbitrarily combining the above-described items, such as property values, forms, manufacturing methods, applications or the like, that indicate the technical features.

Measurements and the like of properties in the examples and the comparative examples were performed by the following methods.

[Weight-Average Molecular Weight (Mw) and Molecular Weight Distribution]

The weight-average molecular weight (Mw) and the molecular weight distribution during and after the polymerization of the block copolymer (B) and the methacrylic resin (A) were determined by GPC (Gel Permeation Chromatography) as the polystyrene equivalent molecular weight.

Device: GPC device "HLC-8320" made by Tosoh Corporation
Separation column: "TSKguardcolum SuperHZ-H", "TSKgel HZM-M" and "TSKgel SuperHZ4000" made by Tosoh Corporation were coupled in series
Eluent: tetrahydrofuran
Flow rate of eluent: 0.35 ml/min
Column temperature: 40° C.
Detection method: differential refractive index (RI)

[Configuration Ratio of Individual Polymer Blocks]

The configuration ratio of the individual polymer blocks was determined by a $^1$H-NMR ($^1$H-nuclear magnetic resonance) measurement.

Device: nuclear magnetic resonance device "JNM-LA400" made by JEOL Ltd.
Deuterated solvent: deuterated chloroform

[Refractive Index of the Block Copolymer (B)]

A sheet having a size of 3 cm×3 cm and a thickness of 3 mm was produced by press forming, and "KPR-200" made by Kalnew Optical Industry Co., Ltd. was used to measure the refractive index at 23° C. with a measurement wavelength of 587.6 nm (d line).

[Haze of Injection-Molded Product]

A platy shaped product having a size of 50 mm×50 mm and a thickness of 3 mm was obtained with an injection molding machine at a resin temperature of 240° C. and a mold temperature of 55° C., and haze was measured at 23° C. in conformity with JIS K7105.

[Flexural Modulus of Injection-Molded Product]

The flexural modulus of the injection-molded product obtained with the injection molding machine at a resin temperature of 240° C. and a mold temperature of 55° C. was measured in conformity with ISO178.

[Impact Resistance of Injection-Molded Product (Charpy Impact Strength)]

The Charpy impact strength without a notch, of the injection-molded product obtained with the injection molding machine at a resin temperature of 240° C. and a mold temperature of 55° C. was measured in conformity with ISO179-1eU.

[Surface Smoothness of Film]

A film having a thickness of 0.1 mm was obtained by being extruded with a T-die film-forming machine (Model FS-5) made by Optical Control System Inc. at a cylinder and T-die temperature of 240° C. with a lip clearance of 0.5 mm. The surface state of the obtained 0.1 mm thick film was observed visually, and the results thereof were evaluated with the following criteria.

A: Surface is smooth
B: Surface is substantially smooth but streaky or grainy convexoconcave are partially produced in the surface
C: Surface is not smooth due to streaky or grainy convexoconcave

[Windability of Sheet]

A platy shaped product (sheet) having a thickness of 0.5 mm was obtained by being extruded with the film-forming machine (Model FS-5) made by Optical Control System Inc. at a cylinder and T-die temperature of 240° C. with a lip clearance of 1.0 mm. This sheet was wounded on a roll having a core diameter of 50 mm. The state at the time of winding was observed, and the results thereof were evaluated with the following criteria.

A: Winding can be performed without the sheet being broken
B: Sheet is broken and winding cannot be performed

[Temperature Dependence of Haze of Platy Shaped Product]

A 50 mm×50 mm test piece was cut out from the 0.5 mm thick platy shaped product obtained with the method described above, and haze was measured with a direct reading haze meter (made by Nippon Denshoku Industries Co., Ltd.) at 23° C. in conformity with JIS K7136. This measurement value was assumed to be a haze value at 23° C.

Then, the test piece was left in a thermostatic chamber at 60° C. for 30 minutes. The test piece was taken out of the thermostatic chamber, and immediately, haze was measured with the direct reading haze meter (made by Nippon Denshoku Industries Co., Ltd.) in conformity with JIS K7136. This measurement value was assumed to be a haze value at 60° C.

The temperature dependence was indicated by the difference between the haze value at 60° C. and the haze value at 23° C. A lower value of the difference indicates that the temperature dependence was lower.

In reference examples shown below, used was a compound which was dried and prepared by a conventional method and in which nitrogen purge was performed. The compound was transferred and fed in an atmosphere of nitrogen.

Reference Example 1

Synthesis of Block Copolymer (B-1)

At room temperature, 39.4 g of a toluene solution comprising 735 g of dried toluene, 0.4 g of hexamethyltriethylenetetramine and 20 mmol of isobutyl bis(2,6-di-t-butyl-4-methylphenoxy)aluminum was added into a three-necked flask whose internal gas was replaced with nitrogen, and 1.17 mmol of sec-butyl lithium wad further added thereinto. 35.0 g of methyl methacrylate was added thereto and a reaction was performed at room temperature for one hour. The polymer comprised in the reaction solution was sampled and its weight-average molecular weight (hereinafter referred to as $Mw_{(b1-1)}$) was measured, it was found to be 40,000. In the methyl methacrylate polymer described above, the acrylic acid ester was further subjected to block copolymerization, and thus the methyl methacrylate was converted into methacrylic acid ester polymer block (b1) (hereinafter referred to as a "methyl methacrylate polymer block (b1-1)").

Then, the temperature of the reaction solution was reduced to −25° C., and a mixture solution of 49.0 g of n-butyl acrylate and 21.0 g of benzyl acrylate was dropped for 0.5 hours. When immediately after the drip, the polymer comprised in the reaction solution was sampled, and its weight-average molecular weight was measured, it was found to be 120,000. Since the weight-average molecular weight of the methyl methacrylate polymer block (b1-1) was 40,000, the weight-average molecular weight $Mw_{(b2)}$ of the acrylic acid ester polymer block (b2) composed of a copolymer of n-butyl acrylate and benzyl acrylate was determined to be 80,000.

Then, 35.0 g of methyl methacrylate was added, the temperature of the reaction solution was returned to room temperature and the reaction solution was agitated for 8 hours, with the result that the second methacrylic acid ester polymer block (b1) (hereinafter referred to as a "methyl methacrylate polymer block (b1-2)") was formed. Thereafter, 4 g of methanol was added to the reaction solution to stop the polymerization, then a large amount of methanol was poured into the reaction solution and the block copolymer (B), which was a tri-block copolymer (hereinafter referred to as a "block copolymer (B-1)"), was precipitated, filtered and isolated by drying at 80° C. at 1 torr (about 133 Pa) for 12 hours. The weight-average molecular weight $Mw_{(B)}$ of the block copolymer (B-1) obtained was 160,000. Since the weight-average molecular weight of the di-block copolymer was 120,000, the weight-average molecular weight (referred to as $Mw_{(b1-2)}$) of the methyl methacrylate polymer block (b1-2) was determined to be 40,000. Since both the weight-average molecular weight $Mw_{(b1-1)}$ of the methyl methacrylate polymer block (b1-1) and the weight-average molecular weight $Mw_{(b1-2)}$ of the methyl methacrylate polymer block (b1-2) were 40,000, $Mw_{(b1)}$ was 40,000. The results of analysis of the block copolymer (B-1) are shown in table 1.

In table 1, the structural unit derived from methyl methacrylate, the structural unit derived from n-butyl acrylate and the structural unit derived from benzyl acrylate are referred to as a "methyl methacrylate unit", an "n-butyl acrylate unit", and a "benzyl acrylate unit", respectively.

Reference Examples 2 to 6

Synthesis of Block Copolymers (B-2) to (B-6)

Block copolymers (B) (referred to as block copolymers (B-2) to (B-6)) are synthesized by the same method as in reference example 1 except that the used amounts of hexamethyltriethylenetetramine, isobutyl bis(2,6-di-t-butyl-4-methylphenoxy)aluminum, and sec-butyl lithium were changed. The results of analysis of the block copolymers (B-2) to (B-6) obtained are shown in table 1.

Reference Example 7

Synthesis of Methacrylic Resin (A-1)

A raw material liquid was obtained by adding, to a monomer mixture consisting of 95 parts by mass of methyl methacrylate and 5 parts by mass of methyl acrylate, 0.1 part by mass of a polymerization initiator (2,2'-azobis(2-methyl propionitrile), hydrogen abstraction function: 1%, 1 hour half-life temperature: 83° C.) and 0.77 part by mass of a chain transfer agent (n-octyl mercaptan) and dissolving them.

A mixture liquid was obtained by mixing 100 parts by mass of ion-exchanged water, 0.03 part by mass of sodium sulfate and 0.46 part by mass of a suspending dispersant (B). Into a pressure resistant polymerization chamber, 420 parts by mass of the mixture liquid and 210 parts by mass of the raw material liquid were charged, the temperature was set at 70° C. while being agitated in an atmosphere of nitrogen and thus a polymerization reaction was started. When three hours elapsed after the start of the polymerization reaction, the temperature was increased to 90° C. and the agitation was continued for one hour to obtain a liquid comprising a copolymer in a form of bead dispersed. Although a small amount of polymer was adhered to the wall surface of the polymerization chamber and the agitation blades, the polymerization reaction proceeded smoothly without foaming.

The obtained copolymer dispersion liquid was washed with an appropriate amount of ion-exchanged water, the copolymer in a form of bead was taken out with a bucket-type centrifuge and was dried with a hot-air dryer of 80° C. for 12 hours to obtain a methacrylic resin (A) (hereinafter referred to as a "methacrylic resin (A-1)") in a form of bead.

The obtained methacrylic resin (A-1) had the weight-average molecular weight $Mw_{(A)}$ of 30,000 and the molecular weight distribution of 1.8.

Reference Example 8

Synthesis of Methacrylic Resin (A-2)

A methacrylic resin (A-2) whose weight-average molecular weight $Mw_{(A)}$ was 55,000 and molecular weight distri-

TABLE 1

|  | Ref. Ex. 1 | Ref. Ex. 2 | Ref. Ex. 3 | Ref. Ex. 4 | Ref. Ex. 5 | Ref. Ex. 6 |
| --- | --- | --- | --- | --- | --- | --- |
| block copolymer (B) | B-1 | B-2 | B-3 | B-4 | B-5 | B-6 |
| $Mw_{(B)}$ | 160000 | 100000 | 240000 | 18000 | 60000 | 300000 |
| $Mw_{(B)}/Mn_{(B)}$ | 1.13 | 1.13 | 1.13 | 1.13 | 1.13 | 1.13 |
| refractive index $n_d$ | 1.490 | 1.490 | 1.490 | 1.490 | 1.490 | 1.490 |
| polymer block (b1-1) |  |  |  |  |  |  |
| $Mw_{(b1-1)}$ | 40000 | 25000 | 80000 | 4500 | 15000 | 75000 |
| methyl methacrylate unit [mass %] | 100 | 100 | 100 | 100 | 100 | 100 |
| polymer block (b2) |  |  |  |  |  |  |
| $Mw_{(b2)}$ | 80000 | 50000 | 80000 | 9000 | 30000 | 150000 |
| n-buthyl acrylate unit [mass %] | 70 | 70 | 70 | 70 | 70 | 70 |
| benzyl acrylate unit [mass %] | 30 | 30 | 30 | 30 | 30 | 30 |
| polymer block (b1-2) |  |  |  |  |  |  |
| $Mw_{(b1-2)}$ | 40000 | 25000 | 80000 | 4500 | 15000 | 75000 |
| methyl methacrylate unit [mass %] | 100 | 100 | 100 | 100 | 100 | 100 | bution was 1.8 was obtained by the same method as in reference example 7 except that the amount of chain transfer agent was changed to 0.45 part by mass.

Reference Example 9

A methacrylic resin (A-3) whose weight-average molecular weight $Mw_{(A)}$ was 90,000 and molecular weight distribution was 1.8 was obtained in the same method as in reference example 7 except that the amount of chain transfer agent was changed to 0.26 part by mass.

Reference Example 10

A methacrylic resin (A-3) whose weight-average molecular weight $Mw_{(A)}$ was 130,000 and molecular weight distribution was 1.8 was obtained in the same method as in reference example 7 except that the amount of chain transfer agent was changed to 0.16 part by mass.

Example 1

With a twin-screw extruder, 40 parts by mass of the block copolymer (B-1) and 60 parts by mass of the methacrylic resin (A-3) were melted and kneaded at 230° C. Thereafter, by performing extrusion and cutting, pellets formed of the methacrylic resin composition were manufactured.

Using the pellets, according to the test methods described above, haze, flexural modulus, Charpy impact strength, surface smoothness, windability and the temperature dependence of haze were evaluated. The results thereof are shown in table 2.

Example 2

With a twin-screw extruder, 40 parts by mass of the block copolymer (B-2) and 60 parts by mass of the methacrylic resin (A-2) were melted and kneaded at 230° C. Thereafter, by performing extrusion and cutting, pellets formed of the methacrylic resin composition were manufactured.

Using the pellets, in the same method as in example 1, physical properties were measured. The results thereof are shown in table 2.

Example 3

With a twin-screw extruder, 40 parts by mass of the block copolymer (B-3) and 60 parts by mass of the methacrylic resin (A-2) were melted and kneaded at 230° C. Thereafter, by performing extrusion and cutting, pellets formed of the methacrylic resin composition were manufactured.

Using the pellets, in the same method as in example 1, physical properties were measured. The results thereof are shown in table 2.

Comparative Examples 1 to 7

Pellets were manufactured in the same method as in example 1 except that the formulation shown in table 1 was followed.

Using the pellets, in the same method as in example 1, physical properties were measured. The results thereof are shown in tables 2 and 3. In comparative example 7, instead of the block copolymer (B), a cross-linked rubber particle containing resin "PARAPET GR-100" made by Kuraray Co., Ltd. was used.

TABLE 2

|  | Example | | | Comp. Ex. | |
| --- | --- | --- | --- | --- | --- |
|  | 1 | 2 | 3 | 1 | 2 |
| methacrylic resin composition | | | | | |
| methacrylic resin (A) [parts by mass] | | | | | |
| methacrylic resin (A-1) $Mw_{(A)}$ = 30000 | | | | | |
| methacrylic resin (A-2) $Mw_{(A)}$ = 55000 | | 60 | 60 | 60 | 60 |
| methacrylic resin (A-3) $Mw_{(A)}$ = 90000 | 60 | | | | |
| methacrylic resin (A-4) $Mw_{(A)}$ = 130000 | | | | | |
| methacrylic resin PARAPET GR-100 | | | | | |
| block copolymer (B) [parts by mass] | | | | | |
| block copolymer (B-1) $Mw_{(b1)}$ = 40000 $Mw_{(b2)}$ = 80000 | 40 | | | | |
| block copolymer (B-2) $Mw_{(b1)}$ = 25000 $Mw_{(b2)}$ = 50000 | | 40 | | | |
| block copolymer (B-3) $Mw_{(b1)}$ = 80000 $Mw_{(b2)}$ = 80000 | | | 40 | | |
| block copolymer (B-4) $Mw_{(b1)}$ = 4500 $Mw_{(b2)}$ = 9000 | | | | 40 | |
| block copolymer (B-5) $Mw_{(b1)}$ = 15000 $Mw_{(b2)}$ = 30000 | | | | | |
| block copolymer (B-6) $Mw_{(b1)}$ = 75000 $Mw_{(b2)}$ = 150000 | | | | | 40 |
| $Mw_{(A)}/Mw_{(b1)}$ | 2.3 | 2.2 | 0.7 | 12.2 | 0.7 |
| properties of shaped product | | | | | |
| Haze [%] | 0.2 | 0.2 | 0.2 | 0.2 | 0.2 |
| Flexural modulus | 2300 | 2300 | 2500 | 2300 | 2300 |
| Charpy impact strength [kJ/m²] | 36 | 30 | 33 | 34 | 35 |
| Surface smoothness of film | A | A | A | A | C |
| Windability of sheet | A | A | A | A | A |
| Temperature dependence of haze of platy shaped product (500 μm) | 0.0 | 0.0 | 0.0 | 0.3 | 0.0 |

TABLE 3

|  | Comp. Ex. | | | | |
| --- | --- | --- | --- | --- | --- |
|  | 3 | 4 | 5 | 6 | 7 |
| methacrylic resin composition | | | | | |
| methacrylic resin (A) [parts by mass] | | | | | |
| methacrylic resin (A-1) $Mw_{(A)}$ = 30000 |  |  | 60 | 60 |  |
| methacrylic resin (A-2) $Mw_{(A)}$ = 55000 |  |  |  |  |  |
| methacrylic resin (A-3) $Mw_{(A)}$ = 90000 |  |  |  |  | 30 |
| methacrylic resin (A-4) $Mw_{(A)}$ = 130000 | 60 | 60 |  |  |  |
| methacrylic resin PARAPET GR-100 |  |  |  |  | 70 |
| block copolymer (B) [parts by mass] | | | | | |
| block copolymer (B-1) $Mw_{(b1)}$ = 40000 $Mw_{(b2)}$ = 80000 |  |  |  |  |  |
| block copolymer (B-2) $Mw_{(b1)}$ = 25000 $Mw_{(b2)}$ = 50000 |  | 40 |  |  |  |
| block copolymer (B-3) $Mw_{(b1)}$ = 80000 $Mw_{(b2)}$ = 80000 |  |  | 40 |  |  |
| block copolymer (B-4) $Mw_{(b1)}$ = 4500 $Mw_{(b2)}$ = 9000 |  |  |  |  |  |
| block copolymer (B-5) $Mw_{(b1)}$ = 15000 $Mw_{(b2)}$ = 30000 |  |  |  | 40 |  |
| block copolymer (B-6) $Mw_{(b1)}$ = 75000 $Mw_{(b2)}$ = 150000 | 40 |  |  |  |  |
| $Mw_{(A)}/Mw_{(b1)}$ | 0.9 | 5.2 | 0.4 | 2.0 | — |
| properties of shaped product | | | | | |
| Haze [%] | 0.2 | 0.2 | 0.2 | 0.2 | 0.7 |
| Flexural modulus | 2300 | 2300 | 2500 | 2300 | 2700 |
| Charpy impact strength [kJ/m$^2$] | 37 | 37 | 10 | 8 | 45 |
| Surface smoothness of film | C | C | — | — | A |
| Windability of sheet | A | A | — | — | A |
| Temperature dependence of haze of platy shaped product (500 μm) | 0.0 | 0.4 | — | — | 0.7 |

It is found from these results that the methacrylic resin composition obtained by mixing, in a mass ratio of 10/90 to 99/1, the methacrylic resin, whose weight-average molecular weight $Mw_{(A)}$ falls within a range of not less than 0.5 and not more than 2.5 with respect to the maximum weight-average molecular weight $Mw_{(b1)}$ of the methacrylic acid ester polymer blocks (b1), with the block copolymer (B) comprising the acrylic acid ester polymer blocks (b2) whose maximum weight-average molecular weight $Mw_{(b2)}$ falls within a range of not less than 40000 and not more than 120000 is excellent in mechanical properties, surface smoothness, transparency and the like and has small variations in haze in a temperature range of 23 to 60° C. In other words, the platy shaped product obtained from the methacrylic resin composition of the present invention is suitable for various types of optical applications, in particular, a planar light source element.

The invention claimed is:

1. A methacrylic resin composition comprising:
   60 to 99 parts by mass of a methacrylic resin (A) comprising 80% by mass or more of a structural unit derived from methyl methacrylate; and
   40 to 1 part by mass of a block copolymer (B) comprising a methacrylic acid ester polymer block (b1) and an acrylic acid ester polymer block (b2),
   wherein a total of the methacrylic resin (A) and the block copolymer (B) is 100 parts by mass,
   wherein a weight average molecular weight $Mw_{(A)}$ of the methacrylic resin (A), a maximum weight average molecular weight $Mw_{(b1)}$ of the methacrylic acid ester polymer block (b1), and a maximum weight-average molecular weight $Mw_{(b2)}$ of the acrylic acid ester polymer block (b2) satisfy (1) and (2):

$$0.5 \leq Mw_{(A)}/Mw_{(b1)} \leq 2.5 \quad (1)$$

$$80000 \leq Mw_{(b2)} \leq 120000, \text{ and} \quad (2)$$

wherein a refractive index of the block copolymer (B) is 1.485 to 1.495.

2. The methacrylic resin composition according to claim 1,
   wherein the acrylic acid ester polymer block (b2) comprises 50 to 90% by mass of a structural unit derived from an acrylic acid alkyl ester and 50 to 10% by mass of a structural unit derived from a (meth)acrylic acid aromatic ester.

3. A shaped product comprising the methacrylic resin composition according to claim 1.

4. A platy shaped product comprising the methacrylic resin composition according to claim 1.

5. A planar light source element comprising:
   the platy shaped product according to claim 4, and a light source located on an edge face of the platy shaped product.

6. The planar light source element according to claim 5, which is a front light for a display device.

7. The planar light source element according to claim 5, which is a backlight for a display device.

8. The methacrylic resin composition according to claim 1,
   wherein the block copolymer (B) comprises 10 to 60% by mass of the methacrylic acid ester polymer block (b1) and 90 to 40% by mass of the acrylic acid ester polymer block (b2).

9. The methacrylic resin composition according to claim 1, wherein the block copolymer (B) has a weight average molecular weight of 100000 to 400000.

10. The methacrylic resin composition according to claim 1, wherein the methacrylic acid ester polymer block (b1) has a weight average molecular weight of 12000 to 150000 and the acrylic acid ester polymer block (b2) has a weight average molecular weight of 80000 to 120000.

11. The methacrylic resin composition according to claim 9, wherein the methacrylic acid ester polymer block (b1) has a weight average molecular weight of 12000 to 150000 and the acrylic acid ester polymer block (b2) has a weight average molecular weight of 80000 to 120000.

12. The platy shaped product according to claim 4, wherein the difference between an average light transmittance in a wavelength range of 400 to 500 nm and an average light transmittance in a wavelength range of 501 to 780 nm is not more than 25%.

\* \* \* \* \*